United States Patent [19]
Strauff

[11] 3,745,769
[45] July 17, 1973

[54] HYDRAULIC SERVO-STEERING SYSTEM
[75] Inventor: Günther Strauff, Kaarst, Germany
[73] Assignee: Langen & Co., Dusseldorf, Germany
[22] Filed: Nov. 11, 1971
[21] Appl. No.: 197,710

[52] U.S. Cl. ................................................ 60/392
[51] Int. Cl. ........................................... F15b 15/18
[58] Field of Search ............................ 60/52 S, 392; 180/79.2 R

[56] References Cited
UNITED STATES PATENTS
2,906,247  9/1959  Brueder ........................... 60/52 S X
3,207,254  9/1965  De Venel ......................... 60/52 S X Primary Examiner—Edgar W. Geoghegan
Attorney—Holman & Stern

[57] ABSTRACT

A hydraulic servo-steering system for vehicles having wheels in which there are provided a supply reservoir, a pressure source and a steering wheel unit defined by the wheel per se, a spindle composed of first and second sections arranged relatively movable toward each other by a small amount, with one section being connected to the steering wheel and the other to a steering mechanism for the wheels. At least one hydraulic motor which reacts on a counter-rotation of the sections is engaged suchwise as to effect a support of the steering movement of the wheels and a return signal device which signals back to the steering wheel a moment of reaction in accordance with the outer momentum. A control device for the pressure medium and the return signal device is provided with pistons arranged in a valve body transverse to the longitudinal axis of the spindle sections and eccentric thereto so that the valve body is connected with the steering mechanism and with connections for the pressure medium whereby the supply and removal of the pressure medium is ensured independent of the angular position of the valve body. An operating member serves to actuate the pistons independently of the relative position of the two sections toward each other, with the pistons having reaction faces which are influenced by the respective pressures of the hydraulic motor to effect a moment of reaction on the steering wheel.

1 Claim, 5 Drawing Figures

HYDRAULIC SERVO-STEERING SYSTEM

BACKGROUND OF THE INVENTION

The instant invention relates to a hydraulic servo-steering system, especially for vehicles having wheels and which are provided with a supply reservoir, a pressure source, preferably a combination comprising a pump and a pressure storage; a power transmission unit consisting of at least two sections arranged relatively rotatable towards each other by a minor amount, preferably a steering shaft or spindle defined by two sections in which one section is connected with a steering gear or a similar mechanism, and the other section to a steering wheel, at least one hydraulic motor which reacts on a counter-rotation of the sections, and is engaged in such a way as to effect a support of the steering movement of the wheels, directed by the steering wheel, as well as a return signal device, which signals back to the steering wheel a moment of reaction in accordance with the outer momentum, with the control device of the pressure means and the return signal device being provided with pistons arranged in a valve body transversely to the longitudinal axis of the rotatable sections and preferably eccentric thereto, whereby the valve body is in a functional connection with the steering gear and is provided with connections for pressure means suchwise that the supply or removal of pressure medium is guaranteed independent of the angular positioning of the valve body, while the other section contains an activating or operating device which activates the pistons independently of the relative position of the two sections towards each other, whereby the pistons have reaction faces which are influenced by the respective pressures of the motor and thereby effect a moment of reaction on the steering wheel.

Such a servo-steering mechanism is known, for example, in German Pat. No. 1,001,132 which discloses two steering pistons, each of which has the function of a 3/3 servo-path valve, and which are counter-rotatingly activated. It is thereby possible to connect the work spaces of the motor interchangeably with the pressure source of the reservoir container. A differential cylinder is proposed as a motor, i.e. a cylinder having various sizes of effective work spaces. Reaction spaces serve the frontal faces of the pistons which naturally have the identical diameters. A disadvantage of this arrangement is that both pistons and the inherent control grooves and/or control channels in the valve body must be coordinated in a very precise manner. A further disadvantage develops when the effective spaces of the motor differ by a substantial amount. In identical forces of the wheels which have to be overcome without special corrective measures, there result various pressures and in identical diameters of the pistons appear various moments of reaction. Finally, there is another disadvantage added, which is true in many of the so-called "closed center steerings". Since the work spaces of the motor in a straight forward drive are separated from the pressure source, there is the possibility of jerking motions to the servo-steering during steering movements which develop during the transmission from the non-reinforced steering, that is during the overlapping of the control-grooves and/or control channels, so that pressure medium, under high pressure from the pressure supply means, flows into the pressureless work spaces.

It is the object of the present invention to overcome such disadvantages and to provide a servo-steering device of the type above-mentioned which is simpler in structural detail, safer in operation, and more economical to manufacture and in which a jerking or jumping of the motor is avoided.

SUMMARY OF THE INVENTION

To accomplish the foregoing and other advantageous objects, there is provided the combination of individual and to some extent known characteristics, as follows:

a. The motor is a differential motor, particularly a differential cylinder having two functional areas of various sizes and work spaces arranged in these areas.

b. There are at least two pistons which have counter-rotating reaction faces and which are arranged so that they either engage at the same lever arm, and their reaction faces behave in the same manner as the effective areas of the motor, or their reaction faces and the lever arms function together in accordance with the respective effective faces of the motor.

c. One of the pistons, preferably that of the smallest diameter, at the same time serves as a control piston capable of connecting the work space of the larger effective face of the motor, selectively either with the pressure source or with the reservoir container, and locking these connections in a center position in such a manner that a positive or zero overlapping is provided.

d. The work space which is arranged in the smaller effective area of the motor is constantly connected with the pressure source.

BRIEF DESCRIPTION OF THE DRAWINGS

The instant invention is explained in greater detail on hand of the exemplary embodiments as shown in the drawings.

DETAILED DESCRIPTION OF THE DRAWINGS

Figure 1:
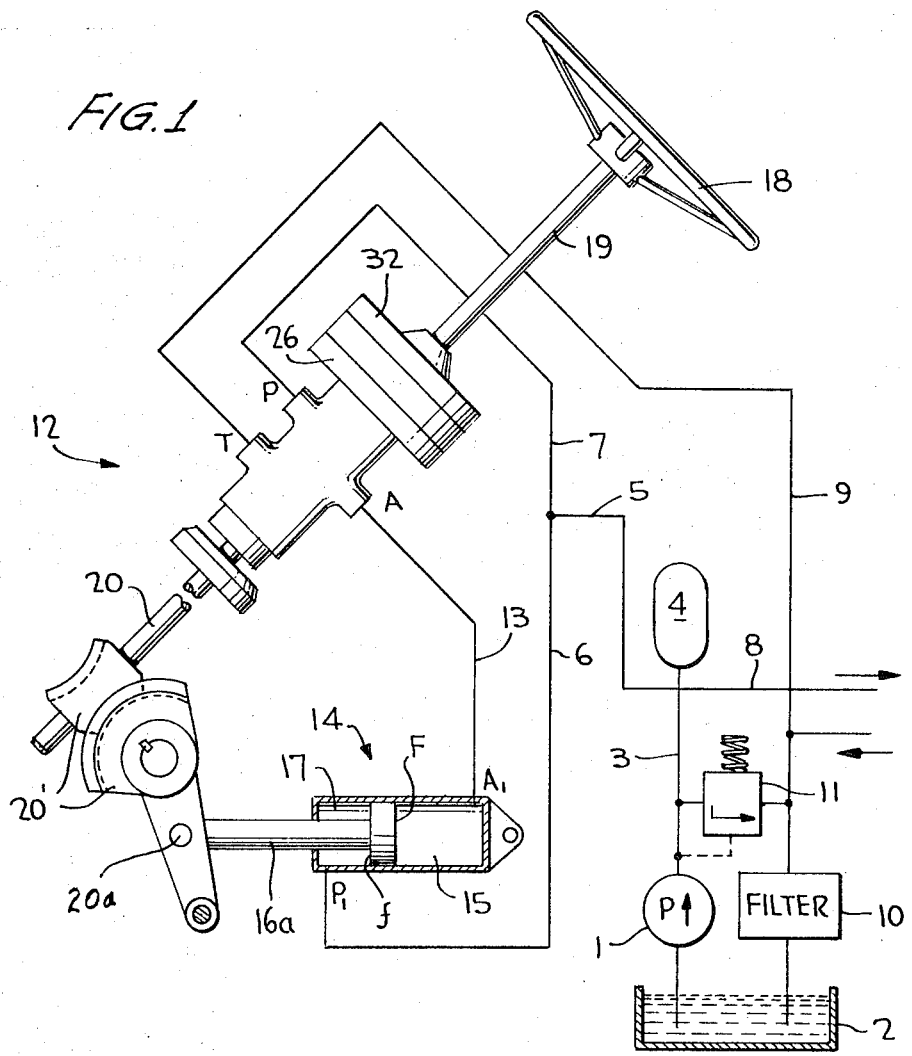
FIG. 1 is a diagrammatic view of a servo-steering system embodying the invention.

A pressure medium is drawn by a pump 1 from a reservoir container 2 and directed to a pressure storage or accumulator 4 through a conduit 3, as well as through a branch conduit 5 to additional conduits 6 and 7. Additional users can be connected to a conduit 8 which also branches from the conduit 3. The return of the medium is via a return conduit 9 having a filter 10 mounted therein to the reservoir container 2.

A safety valve 11 is arranged between the conduit 3 and the return conduit 9. The conduit 7 leads to a connection P of a pressure medium control and indicator device denoted generally 12 which is also provided with a connection T for the return conduit 9 and a connection A which, via conduit 13 is connected with a connection $A_1$ leading to a work space 15 arranged at the larger working face F of a piston 16. The conduit 6 ends in a connection $P_1$ which leads to a work space 17 associated with the smaller working face f. A steering wheel 18 has a spindle or shaft defined by first and second sections 19, 20 and the wheel 18 is connected with the first section 19. The second section 20 is operably connected to a steering gear 20' which in turn is connected to piston rod 16a of differential cylinder 14, as shown at 20a. For reasons of clarity, the ground wheels are not illustrated.

Figure 2:
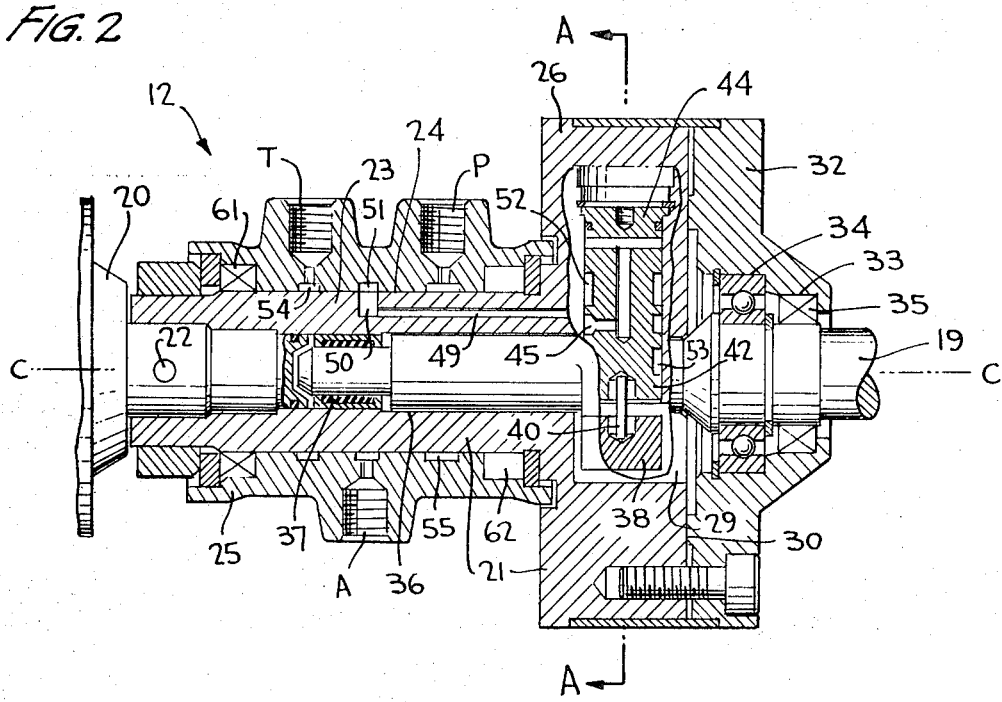
FIG. 2 is a view taken along line B—B of FIG. 3, the view looking in the direction of the arrows.
Figure 3:
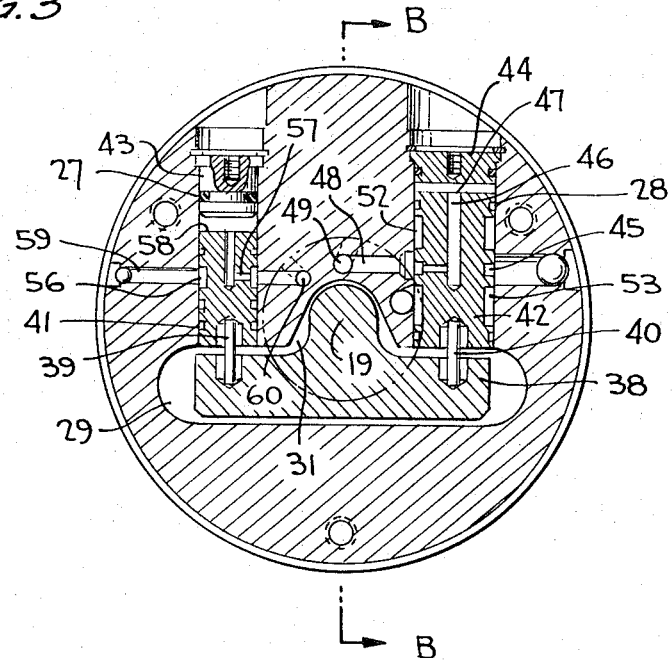
FIG. 3 is a view taken along line A—A of FIG. 2, the view looking in the direction of the arrows.

The cooperation of the sections 19 and 20 as well as the pressure medium control and pressure indicator device 12 is illustrated in FIGS. 2 and 3. The section 20 is fixedly connected with a valve body 21 by means of a cross pin 22. The valve body 21 is formed with an elongated cylindrical part 23 which is rotatably mounted in a bore 24 of a connection body 25. The body 25 is non-rotatably and axially immovably mounted on the vehicle chassis (not shown). The cylindrical part 23 extends into the bore 24 and includes an external member 26 of larger diameter.

In the member 26 are arranged bores 27 and 28 of different diameters, and the bores are arranged transversely and eccentrically to axis C—C of the sections 19, 20, with the lower ends of the bores 27, 28 extending beyond the center of the member 26 or the axis C—C. Such lower ends terminate in a slot-shaped hollow space 29, extending at a right angle to their axes. The space 29 opens towards free front face 30 of the member 26. In accordance with its depth, the hollow space 29 is also intersected by an opening 31 which extends coaxially to the axis C—C.

The front face 30 is covered by a bearing cap or cover 32 which has a centrally stepped bore 33 for receiving a roller bearing 34 and a shaft-packing 35 respectively. The roller bearing 34 serves for the positioning of the section 19 of the steering wheel shaft which also enters the opening 31 and projects into a central bore 36 in valve body 21, in which it is positioned with the aid of a needle bearing 37.

An activating or operating member constituted by a dual-sided lever 38 is connected with the section 19 and is positioned freely in the hollow space 29. The lever 38 effects the pistons 41 and 42 via the pushers 39 and 40, whereby the pistons are slidably arranged in the bores 27 and 28. The outer ends of the bores 27 and 28 are closed by means of threaded plugs 43 and 44.

The piston 42 has an annular groove 45 at approximately its center from which a channel 46 leads to front face 47 of the piston 42 which faces the plug 44. Opposite the annular groove 45, a transverse bore 48 bears on the bore 28. The transverse bore 48 is adjoined by a bore 49 in the cylindrical part 23 which is parallel to the axis C—C, and communicates with a bore 50 which ends in the connection body 25 opposite to an annular groove 51. The groove 51 adjoins the connection A. Two additional annular grooves 52 and 53 are located at both sides of the groove 45, and are axially separated from each other by a small degree. The groove 52 is connected by means of holes (not shown) with an annular groove 54 which is adjacent the groove 51 and terminates at connection T. The groove 53 is connected in a similar manner with an annular groove 55 which leads to the connection P.

The hollow space 29 is also connected via a channel (not shown) with the system which derives from the connection T. The piston 41 is provided with an annular groove 56 at approximately its center, and the groove 56 is further connected by means of a channel 57 with the front face 58 facing the threaded plug 43. The annular groove 56 is further connected with the groove 55 via a transverse bore 59 which intersects the bore 27, as well as a longitudinal bore 60 and an additional transverse bore. The annular grooves 54 and 55 are sealed towards the outside by shaft packings 61 and 62.

In the position as illustrated, the annular grooves 52 and 53 are separated by the transverse bore 48, so that the connections P and T are also separated from the connection A. The vehicle is driving straight ahead. Since the work space 17 is constantly connected with the pump 1, the piston 16 is hydraulically restrained. Pressure develops in the work space 15 which pressure, without outside power stress of the piston 16 in regards to the pressure in the work space 17, is reduced in the relation of the effective faces F:f. Under the requirement that the effective faces 47 and 58 of the pistons 42 and 41 show the same relationship, identical moments of reaction are transmitted to the lever 38. If then, for example, the steering wheel is turned in a clock-wise direction, the section 19 turns by a small angle relative to the section 20 and in accordance with the lever 38, relative to the valve body 21. The piston 41 is moved into the bore 27, while the piston 42 is moved after the lever 38 by means of the pressure affecting the front face 47. The annular groove 52 moves into the area of the transverse bore 48 without losing its connection with the additonal transverse bore (not shown). This will provide for a connection of the system denoted by components 15, $A_1$, 13, A, 51, 50, 49, 48, 45, 46, 47 with the system denoted by components 52, 54, T, 9, 10, 2, which is generally without pressure. A pressure reduction is developing in the first mentioned system, and the piston 16 moves through the effects of pressure existing in the work space 17 into the work space 15 and supports thereby the steering movement until the annular groove 52 is again separated from the transverse bore 48. Since in this entire process, the pressure on the front face 58 is always bearing on the work space 17, and the front face 47 is basically under the pressure of the work space 15, there develop various moments of reaction in accordance with the pressure difference at the pistons 41 and 42. In this case, the movement of reaction which is developed by the piston 41 is higher so that there results a moment directed entirely towards the clock-wise direction, which counteracts to the turning movement of the steering wheel. The driver thus obtains a certain feeling for the lever 3B, while the piston 42 is moved into the bore 28. The annular groove 53 moves into the area of the transverse bore 48 so that a connection develops between the systems defined by components 15, $A_1$, 13, A, 51, 60, 49, 48, 45, 46, 47 and 4, 5, 7, P, 55, 53 or in brief, from A to P. Since the pressure in P is always higher than that in A, there results a flow from P towards A and from A to $A_1$ to the work space 15. This pressure flow effects a rise in pressure in the cylinder 14 so that the piston 16 moves outwards and carries the steering gear 20' in the direction of the steering wheel movement. This action lasts until the annular groove 53 is again separated from the transverse bore 48. Since again the front areas 47 and 58 are always under the pressure of the respective work spaces 15 and 17, there results through the increase of the pressure in the space 15 an increase of the moment of reaction effected by the piston 42 and thereby a moment which is directed toward the movement of the steering wheel.

Figure 4:
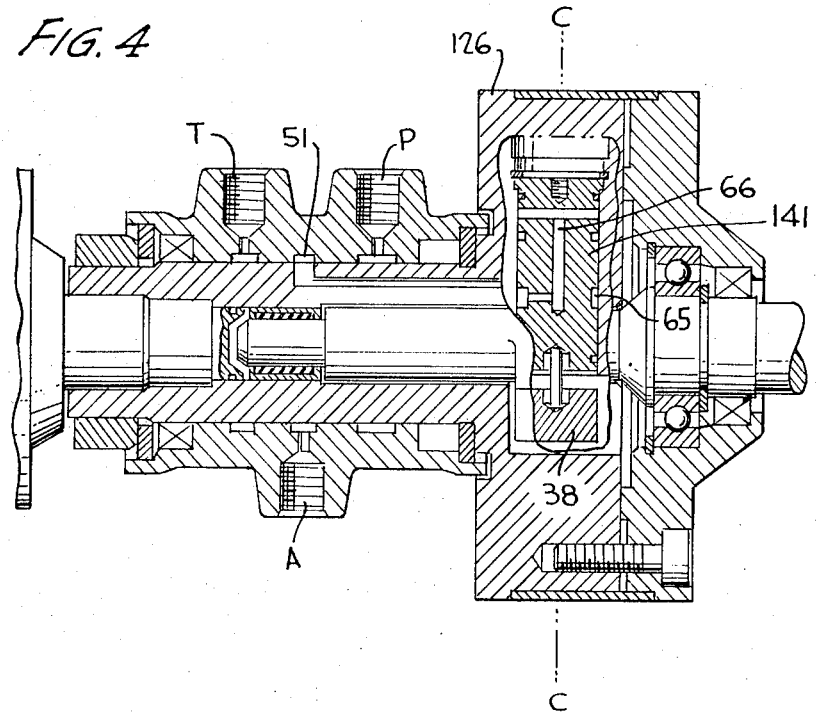
FIG. 4 is a view similar to FIG. 2 with a smaller steering piston.
Figure 5:
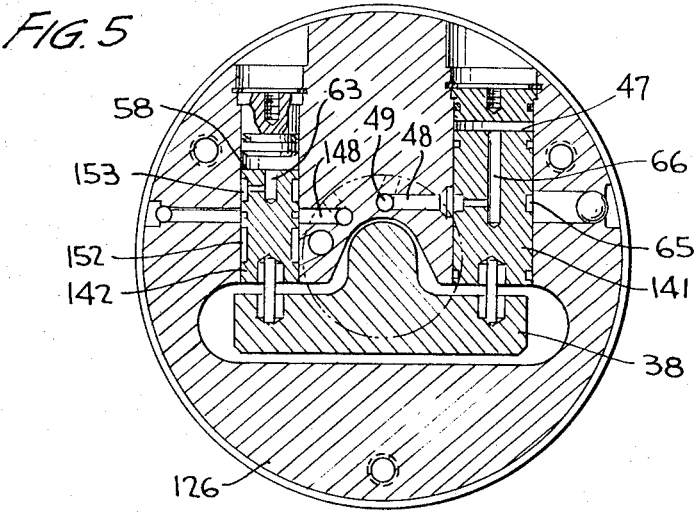
FIG. 5 is a view taken along line C—C of FIG. 4, the view looking in the direction of the arrows.

The embodiment illustrated in FIGS. 4 and 5 differs from that of FIGS. 2 and 3 in that smaller diameters are selected as control pistons for the pistons. The choice of the smallest possible piston diameters can, in some instances, be advantageous insofar as a smaller piston has lower leak losses and demonstrates a smaller tendency for sticking. For simplicity purposes, only the most important positions are supplied with reference numerals, with identical parts bearing the same reference numerals and, in the case of identical functions, the numeral 1 is placed in front of the reference numerals. Accordingly, the control piston is 142 and the reaction piston 141. The control piston 142 is provided with two axially separated annular grooves 152 and 153. The groove 152 is connected by means of channels (not shown in detail) with the connection T. The tee-slot 153 is connected with the front face 58 of the control piston 142 by means of a channel 63. In the neutral position, a shoulder 64 blocks a transverse bore 48 between the grooves 152 and 153, and which is constantly connected with connection A. The reaction piston 141 has an annular tee-slot 65 which is always located in the area of the transverse bore 49, whereby the bore is connected with the connection A, and from which bore a channel 66 leads to the front face 47. The function is the same as that shown in FIGS. 2 and 3.

The present invention offers certain advantages as compared with the common steering mechanisms of the types mentioned in the Background of the Invention, the most important of which are as follows:

Since only one control piston is required, and which functions as a three-way distributing slide valve servopiston, there is only needed two additional control-edges whose location must be adjusted to a transverse bore or an according annular groove. The second piston 41 serves solely as a reaction piston on which no special precision requirements are imposed.

According to the three-way function, there are only three connections required. As shown in practice, the hydraulic setting of the servo motor effects certain advantages since the formerly appearing pressure surges are substantially reduced. The reason for this is that the pressure differences which develop in the individual connections P-A or A-T are reduced in accordance with the relationship of the effective areas. The consumption of pressure medium compared to a servo-steering system with differential cylinders and a common control is also limited since a respective consumption becomes necessary only in the smaller effective area in an area relationship of 2:1. In comparison with servo-steering systems having dual sided piston rods and equally effective areas, there results an advantage of a shorter construction length. Finally, as an advantage should be mentioned the automatic adjustment of the control piston which functions similarly to a pressure reduction valve and which adjusts itself also during a probable wear at the edges.

This invention is not limited to the exemplified embodiments as shown. Thus, it is easily possible to replace the channels within the piston by channels in the housing. Furthermore, the controlled bores or transverse bores can naturally be replaced by belt channels or vice versa. In a similar manner, as it is generally known in hydraulic systems, the control piston can also be formed in a manner such that only one annular groove is provided which interchangeably connects with two neighboring bores or the annular groove in the valve body. The activating member can also be of a different form. Thus, for example, it is known from German Pat. No. 1,133,642 that the lever in a servo-steering system of the type previously mentioned is arranged eccentrically to the piston and is furnished with fingers which engage the piston in elongated holes which are disposed across the piston axes.

It is also up to the designer to position the sections of the steering wheel shaft either by means of a roller or a sleeve bearing element. The servo motor can also comprise a cylinder having dual sided piston rods as long as the effective areas are of various sizes. The steering gear can naturally also take the form, for example, of a rack steering or a ball rotation steering.

I claim:

1. A hydraulic servo-steering system, particularly for wheeled vehicles having wheels, comprising a reservoir for fluid, a pressure source, a steering wheel, a steering wheel spindle defined by two sections movable relatively towards each other by a small amount, one of said sections being connected to the steering wheel, a steering mechanism, the other of said sections being connected with the steering mechanism, at least one hydraulic motor operably coupled to the steering mechanism, a pressure control for the hydraulic motor whereby the hydraulic motor reacts on a movement of the two sections toward each and is operative to effect support of the steering movement of the wheels transmitted by the steering wheel, a return signal unit having a valve body, pistons arranged in the valve body transversely to the longitudinal axis of said two sections and eccentric to such axis, said valve body being connected to said other section, said valve body having fluid connections so that independent of the angular position of the valve body, the supply and removal of fluid are assured, said one section being provided with operating means for operating said pistons independently of the relative positions of said two sections, with said pistons having reaction areas stressed by the respective fluid within the motor, thereby effecting a moment of reaction on the steering wheel, said hydraulic motor comprising a differential cylinder, a piston and piston rod in the cylinder, a work space of one size between the piston crown and one end of the cylinder and a work space of a different size between the other side of the piston and the opposite end of the cylinder, the piston rod being connected to the steering mechanism and constituting the operative coupling of the motor, said pistons arranged in the valve body of the return signal unit being of different diameters and having counter-active reaction faces, said operating means being lever arms, with said pistons of different diameters being arranged such that said pistons engage the same lever arm and the reaction faces function in accordance with respective effective work spaces of the differential cylinder or the reaction faces are equal and the lever arms function coordinately with the respective effective work spaces of the differential cylinder, the piston of smaller diameter simultaneously serving as a control piston capable of connecting the work space of larger size of the differential piston selectively with either the pressure source or the reservoir and lock such connections in a center position to provide a position or zero overlapping, and the work space of smaller size of the differential cylinder being constantly connected with the pressure source.

* * * * *